United States Patent [19]

Koopman

[11] Patent Number: 4,605,840
[45] Date of Patent: Aug. 12, 1986

[54] HORIZONTAL HOLDING CABINET FOR PREPARED FOOD

[75] Inventor: Peter J. Koopman, Richmond, Ind.

[73] Assignee: Henny Penny Corporation, Eaton, Ohio

[21] Appl. No.: 635,119

[22] Filed: Jul. 27, 1984

[51] Int. Cl.[4] .............................................. F27D 7/02
[52] U.S. Cl. ..................................... 219/401; 126/20.1
[58] Field of Search ............... 219/400, 401, 271, 272, 219/275, 276; 126/20, 20.1, 20.2, 369, 369.1, 369.2, 369.3; 422/11, 26

[56] References Cited

U.S. PATENT DOCUMENTS

| | | | |
|---|---|---|---|
| 194,288 | 8/1877 | Bock | 126/369.3 |
| 565,787 | 8/1896 | O'Neill | 126/369.2 |
| 675,571 | 6/1901 | Ruppert | 126/369.2 |
| 764,107 | 7/1904 | Bradshaw | 126/369.3 |
| 884,288 | 4/1908 | Nash | 219/401 |
| 1,069,377 | 8/1913 | Bell | 219/401 |
| 1,422,348 | 7/1922 | Duncan | 219/401 |
| 2,380,121 | 7/1945 | Robertson | 126/20 |
| 2,469,778 | 5/1949 | Morici | 126/20 |
| 2,750,937 | 6/1956 | Sjölund | 126/369.2 |
| 2,949,525 | 8/1960 | Dunn | 126/20 |
| 3,604,895 | 9/1971 | MacKay | 219/401 |
| 4,010,349 | 3/1977 | Lee | 219/401 |
| 4,039,776 | 8/1977 | Roderick | 219/401 |
| 4,123,969 | 11/1978 | Abbate | 219/401 |
| 4,331,859 | 5/1982 | Thomas | 219/401 |
| 4,509,412 | 4/1985 | Whittenburg | 219/401 |

FOREIGN PATENT DOCUMENTS 0000908  3/1979  European Pat. Off. ............. 219/401

Primary Examiner—Clarence L. Albritton
Assistant Examiner—Teresa J. Walberg
Attorney, Agent, or Firm—Frost & Jacobs

[57] ABSTRACT

An elongated food holding cabinet adapted to be mounted on a wall, the cabinet having a plurality of drawer-containing modules arranged in side-by-side relation, each module having a heating element and an integral water reservoir. The drawers may be provided with vents to control humidity or provided with dispensers for sauces and gravies contained in receptacles in the drawers.

18 Claims, 5 Drawing Figures ns and of the drawer frames being arranged to en-
HORIZONTAL HOLDING CABINET FOR PREPARED FOOD This invention relates to holding cabinets for food products and has to do more particularly with a holding cabinet having a series of side-by-side product drawers which are separately heated and humidified.

BACKGROUND OF THE INVENTION

Holding cabinets have been in use for a number of years to maintain various food products in heated and/or humidified condition. Such cabinets are widely used in carry-out restaurants where the food is prepared in large batches and then stored in the holding cabinets until needed. Depending upon the nature of the foods being stored, the holding cabinets may be heated and they also may be provided with humidifying means to prevent the food from drying out.

Conventional holding cabinets normally comprise vertical units having doors which, when opened, expose a series of shelves or shallow baskets in which the food is stored. Alternatively, the vertical cabinet may contain a series of drawers stacked one above the other in which the food is stored, the drawers being in the form of wire baskets or otherwise perforated to permit the heated and/or humidified air to flow around the food. Such cabinets are usually provided as free-standing floor units or as counter-top units.

In view of the space required for conventional holding cabinets, a need has been felt for a horizontal holding cabinet which has a plurality of product receiving drawers arranged in side-by-side relation so that the unit may be mounted on a shelf or fastened to a wall in areas which are not normally used, thereby freeing up floor and/or counter space for other uses. The present invention provides a holding cabinet of this character.

SUMMARY OF THE INVENTION

In accordance with the present invention, a holding cabinet is provided in the form of an horizontally disposed unit composed of a series of side-by-side drawer containing modules each of which is capable of being independently heated and humidified, thereby enabling the user to utilize the several or more drawers for different food products requiring different degrees of heating and/or humidification.

The unit comprises an elongated relatively shallow cabinet or shell containing a plurality of individual modules, each module having enclosing walls and an open front adapted to slidably receive a drawer the front panel of which makes sealing contact with the front of the cabinet in the area surrounding the open front of the module. The controls for the modules may be located at one or both ends of the cabinet and/or intermediate adjacent modules, depending upon the number of modules in the unit.

The walls of the modules define an enclosing cavity which is heated by the conduction of heat through the walls of the module, the bottom wall of the module preferably being provided with one or more flat electric heating elements of known construction mounted in direct contact with the undersurface of the bottom wall. A thermostat is also mounted on the undersurface of the bottom wall to sense cavity temperature, the thermostat being connected to a thermostatic controller which energizes and deenergizes the heating elements in accordance with the desired temperature.

The bottom wall of each module is also provided with an integral upwardly opening water reservoir, which is preferably centrally disposed in the bottom wall of the module, the reservoir providing for the release of water vapor within the module by heat conduction. A drain is provided for each reservoir and, if desired, a water level indicator may be provided to give a visual indication of the water level in the reservoir.

The drawers preferably will be in the form of slidable frames adapted to support product receiving receptacles of varying sizes, the frames being arranged to engage the rim of the receptacle or its bottom. The receptacles may be either imperforate or perforate depending upon the product to be stored, the arrangement lending itself not only to the storage of individual items, such as pieces of chicken, but also the storage of liquids, such as sauces or gravies. To this end, dispensers may be provided in one or more of the door fronts to dispense measured increments of the sauces, gravies, etc.

If desired, the door fronts may be provided with adjustable vents to enhance circulation within the modules and also effect humidity control. To the extend that such vents generate moisture due to condensation, the construction of the drawer fronts is such that the condensate will be channeled to the underlying reservoir. The cabinet is also provided with a condensation rail underlying the door fronts to receive and dissipate condensate formed during the opening and closing of the drawers.

DESCRIPTION OF THE PREFERRED EMBODIMENTS

Figures 1, 2:
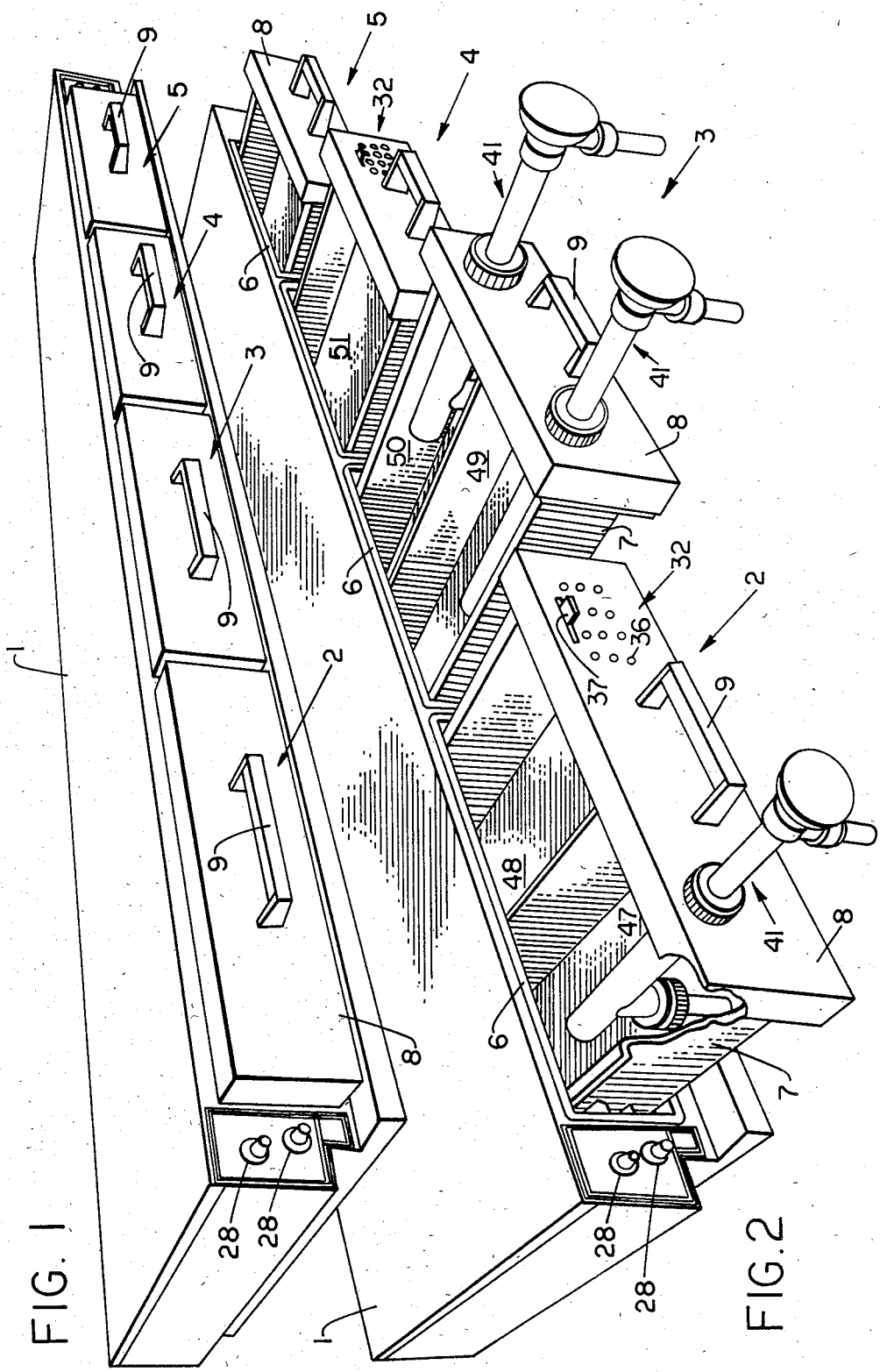
FIG. 1 is a perspective view of an exemplary horizontal holding cabinet in accordance with the invention.
FIG. 2 is a perspective view similar to FIG. 1 but with the drawers open and also illustrating additional features which may be incorporated in the drawers.

Referring first to FIGS. 1 and 2, a horizontal holding cabinet in accordance with the invention comprises an enlonged shell or housing 1 containing a plurality of drawing containing modules, indicated generally at 2, 3, 4 and 5. Each of the modules is a discrete unit, and the housing 1 may contain as many units as desired.

Each of the modules comprises a drawer receiving cavity 6 having an open front adapted to receive a drawer frame 7 having a front panel 8 mounting a handle 9 by means of which the drawer may be opened and closed.

Figure 3:
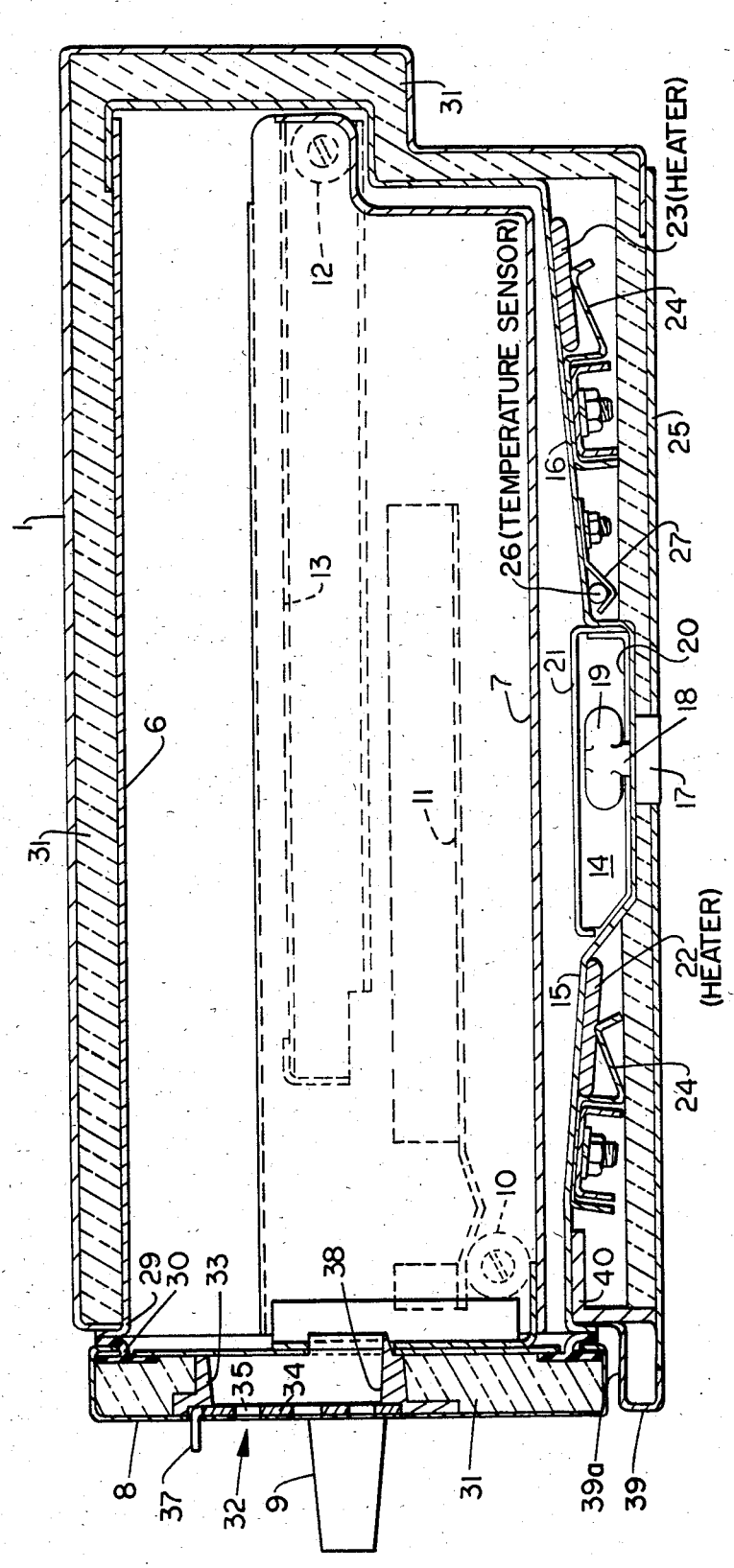
FIG. 3 is an enlarged vertical sectional view taken through one of the drawer openings illustrating the construction of a drawer containing module.

As seen in FIG. 3, each of the drawer frames 7 is provided with conventional drawer suspension members, including guide bearings 10 mounted on the opposite sidewalls of the cavity 6, drawer supports 11 mounted on the door frames for rolling movement along the guide bearings 10, and bearings 12 mounted on the opposite sides of the drawer frames engagable with rails 13 mounted on the opposite sidewalls of the cavity 6. The drawer suspension illustrated is exemplary only, and it will be understood that other forms of drawer suspension mechanisms may be employed.

In accordance with the invention, the bottom wall of the cavity 6 is provided with a centrally disposed reservoir 14 extending between the opposite side walls of the cavity, the bottom wall having front and rear portions 15 and 16 which taper downwardly toward the reservoir 14. The tapered configuration of the wall portions 15 and 16 permits condensation to drain into the reservoir 14. On its undersurface the reservoir 14 is provided with a threaded drain block 17 adapted to receive a drain plug 18 the top of which is in the nature of a wing nut 19 to facilitate removal of the plug when the drawer is opened. Preferably, the reservoir 14 is provided with removable evaporation plates 20 and 21 which are used to control the humidity level in the cavity by varying the exposed water area in the reservoir 14.

The cavity is adapted to be heated by flat steel sheath heating elements 22 and 23 juxtaposed to the undersurfaces of the bottom wall portions 15 and 16, respectively. The heating elements 22 and 23 will preferably extend the full width of the cavity 6, the heating elements being removably secured to the cavity by means of resilient clamps 24 which apply pressure to the heating elements along their full lengths so as to provide maximum surface contact with the bottom wall surfaces of the cavity 6. The resilient clamps permit the heating elements to be easily removed for service and/or replacement. To this end, the bottom of the housing 1 may be provided with a removable access panel 25. Bottom wall portion 16 also mounts a heat sensor or probe 26 which is juxtaposed to the undersurface of wall portion 16 and held in place by a resilient clamp 27 which holds the probe against the bottom wall and insures heat transfer to the probe. It will be understood that the probe will be connected to a thermostatic controller for the heating elements 22 and 23, such controllers being indicated at 28 in FIGS. 1 and 2. Preferably each module will having its own controller so that the temperature and/or humidity may be individually controlled for each module.

Each of the cavity 6 terminates at its open end in an out-turned peripheral flange 29 adapted to seat against the front face of the housing 1. The front panel 8 of each drawer is provided with a peripheral gasket 30 adapted to make sealing contact with the flange 29 when the drawer is closed, thereby effectively sealing the cavity against the transfer of atmosphere when the drawer is closed. This assists in maintaining the interior of the cabinet at the desired temperature, and to this end insulation 31 is provided within the confines of the front panel 8 of the drawer and between the walls of cavity 6 and the surrounding housing 1.

Figure 5:
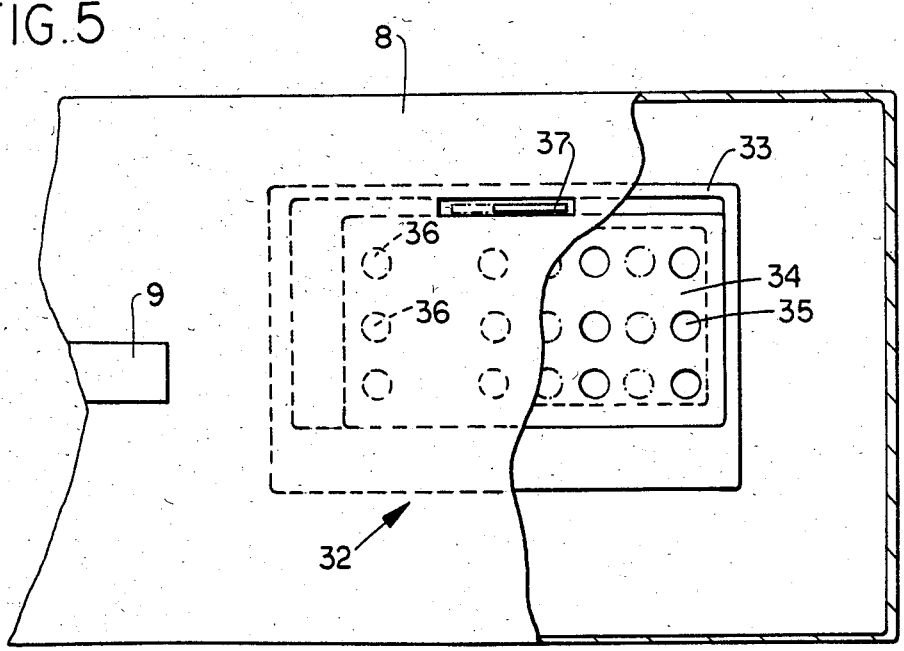
FIG. 5 is an enlarged fragmentary front elevational view of a drawer front incorporating adjustable vents.

Depending upon the nature of the food product being stored and the desired humidity at which the food is to be maintained, the front panel 8 of selected drawers may be provided with a vent, indicated generally at 32. As seen in FIG. 5, the vent comprises a molded vent block 33 mounted within the front panel 8, the vent block slidably receiving a plate 34 having sets of perforations 35 therein adapted to selectively open and close perforations 36 in the front panel 8 as the plate 34 is moved laterally by means of finger tab 37. The vent block 33 has a downwardly inclined bottom surface 38 (seen in FIG. 3) which directs the flow of any moisture condensing on the vent onto the door frame 7, the condensate passing downwardly onto the underlying tapered wall portion 15 which conveys the condensate into the reservoir 14.

The lower front edge of the housing 1 is provided with a drip ledge 39 extending lengthwise of the housing, the drip ledge having a downwardly and inwardly inclined upper surface 39a adapted to collect condensate as the drawer is opened. The drip ledge is attached to an angle brace 40 secured to the undersurface of wall portion 15, the brace acting to transfer sufficient heat to the drip ledge 39 to evaporate condensate as it collects on the drip ledge.

Figure 4:
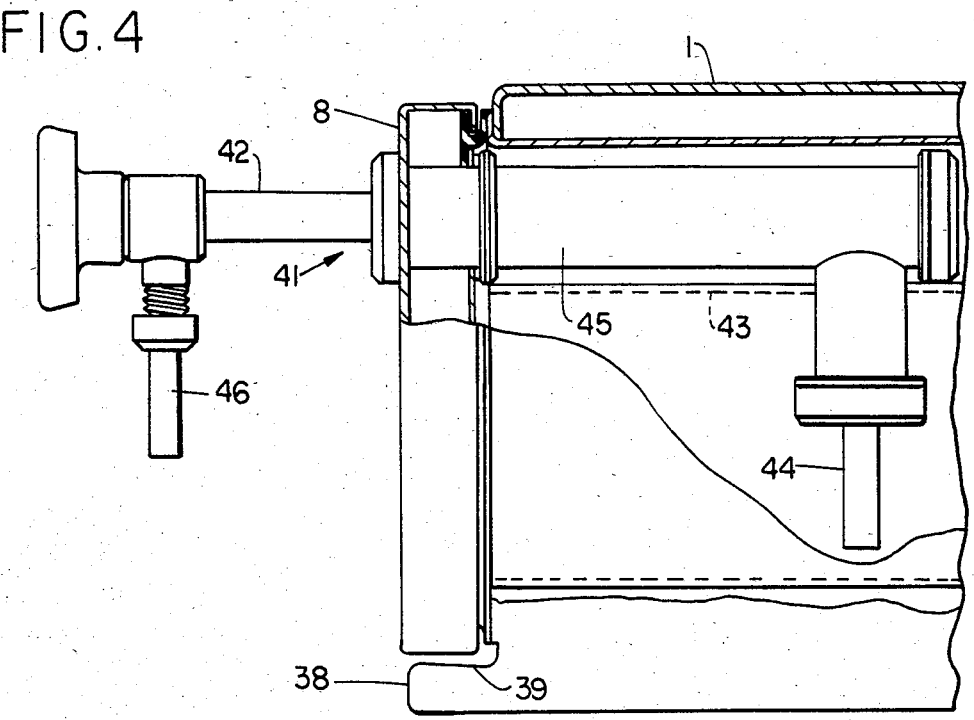
FIG. 4 is an enlarged fragmentary side elevational view with parts broken away illustrating a drawing equipped with a liquid dispenser.

The modules also may be utilized to dispense heated liquids, such as sauces or gravies. To this end, and as seen in FIG. 4, one or more of the drawer fronts 8 may be provided with a dispenser 41 which, in the embodiment illustrated, comprises a plunger 42 which, when displaced inwardly, withdraws liquid from imperforate drawer pan 43 through nozzle 44 and cylinder 45, the liquid being discharged through dispensing nozzle 46.

As will be evident from FIG. 2, the modules lend themselves to various combinations of features ranging from a single drawer pan with a plain drawer front as shown by module 5, to various combinations including vents 32 and/or dispensers 41. Modules 2 illustrates a pair of side-by-side drawer pans 47 and 48, the former being equipped with a dispenser 41, whereas the latter is provided with a vent 32. Module 3 illustrates the use of a pair of drawer pans 49 and 50 each of which is provided with a dispenser 41, so that different sauces or gravies may be dispensed from a single module. Module 4 illustrates a single drawer pan 51, the drawer front being provided with a vent 32. As will be evident, the modules may be tailored to provide the user with any desired feature or combination of features.

What I claim is:

1. A horizontal holding cabinet comprising an elongated housing, a plurality of modules mounted within said housing in side-by-side relation, each of said modules comprising enclosing top, bottom, side and rear walls defining a drawer receiving cavity having an open front, a drawer assembly slidably received in said cavity, said drawer assembly having a front panel adapted to close the open front of the cavity, a heating element juxtaposed to the outersurface of a wall of said module to heat the cavity by conduction, and a water reservoir formed in the bottom wall of said cavity, whereby water vapor may be released within the cavity.

2. The horizontal holding cabinet claimed in claim 1 wherein said water reservoir is centrally located in the bottom wall of said cavity, and wherein a pair of heating elements is mounted on the bottom wall of said cavity on opposite sides of said reservoir.

3. The horizontal holding cabinet claimed in claim 2 including a thermostat mounted on the undersurface of the bottom wall of said cavity, and a thermostatic controller mounted on said housing, said thermostatic controller being operatively connected to said thermostat and to said heating elements.

4. The horizontal holding cabinet claimed in claim 1 including drain means in the bottom of said reservoir.

5. The horizontal holding cabinet claimed in claim 1 wherein said heating element comprises an elongated essentially flat element, and elongated clamping means securing said heating element to a wall of said module, whereby said heating element is maintained in tight engagement with the wall of said module.

6. The horizontal holding cabinet claimed in claim 1 including adjustable plate means overlying said reservoir, whereby to vary the exposed area of water in the reservoir.

7. The horizontal holding cabinet claimed in claim 1 including a condensation rail underlying the front panel of each drawer assembly.

8. The horizontal holding cabinet claimed in claim 7 wherein the upper surface of said condensation rail tapers downwardly and inwardly towards said housing.

9. The horizontal holding cabinet claimed in claim 1 wherein said door assembly includes vent means in the front panel of said drawer assembly.

10. The horizontal holding cabinet claimed in claim 9 wherein said vent means comprises a vent block, a vent plate slidably mounted in said vent block, and perforations in said vent plate adapted to selectively open and close perforations in the front panel of the drawer assembly upon sliding movement of said vent plate.

11. The horizontal holding cabinet claimed in claim 10 wherein said vent block has a lower wall surface positioned to deflect condensate from said vent into the interior of said cavity.

12. The horizontal holding cabinet claimed in claim 1 wherein said door frame assembly includes a liquid dispenser projecting outwardly from the front panel of said drawer assembly, said drawer assembly including an imperforate container for a liquid to be dispensed by said dispenser.

13. A module for a holding cabinet comprising enclosing top, bottom, side and rear walls defining a drawer receiving cavity having an open front, a drawer assembly slidably received in said cavity, said drawer assembly having a front panel adapted to close the open front of said cavity, a water reservoir formed in the bottom wall of said module, and at least one heating element juxtaposed to the undersurface of the bottom wall of the module adjacent said reservoir.

14. The module claimed in claim 13 wherein said reservoir extends between opposite sides of said module, and wherein downwardly and inwardly inclined bottom wall portions lie on opposite sides of said reservoir.

15. The module claimed in claim 14 including drain means in said reservoir.

16. The module claimed in claim 15 wherein a heating element is juxtaposed to the undersurface of each of said bottom wall portions.

17. The module claimed in claim 13 wherein said door assembly includes vent means for controlling humidity within the cabinet.

18. The module claimed in claim 17 wherein said vent means includes a condensate collecting surface positioned to direct condensate downward toward the bottom of said cavity.

* * * * *